No. 780,059. PATENTED JAN. 17, 1905.
G. B. PETSCHE.
PUMP.
APPLICATION FILED APR. 25, 1903.

Witnesses: Inventor:
Gustav B. Petsche
by his atty

No. 780,059. PATENTED JAN. 17, 1905.
G. B. PETSCHE.
PUMP.
APPLICATION FILED APR. 25, 1903.

Witnesses:

Inventor:

No. 780,059. Patented January 17, 1905.

UNITED STATES PATENT OFFICE.

GUSTAV BERNHARD PETSCHE, OF PHILADELPHIA, PENNSYLVANIA, ASSIGNOR TO THE SOUTHWARK FOUNDRY & MACHINE COMPANY, OF PHILADELPHIA, PENNSYLVANIA, A CORPORATION OF PENNSYLVANIA.

PUMP.

SPECIFICATION forming part of Letters Patent No. 780,059, dated January 17, 1905.

Application filed April 25, 1903. Serial No. 154,199.

*To all whom it may concern:*

Be it known that I, GUSTAV BERNHARD PETSCHE, a citizen of the United States of America, residing in the city and county of Philadelphia, in the State of Pennsylvania, have invented a certain new and useful Improvement in Pumps, of which the following is a true and exact description, reference being had to the accompanying drawings, which form a part thereof.

My invention relates to pumps, and is broadly applicable to pumps used in connection with both liquids and gases, though especially adapted for use in connection with incompressible fluids.

Primarily the object of my invention is to provide improved means for actuating the valves controlling the entrance and exit of fluid to and from the pump-chamber, whereby said valves are actuated through resilient means which permit them to remain stationary when the forces opposing their movement exceed a determined amount, the method and, in a broad sense, the means for actuating the valves in connection with liquid-pumps being substantially of the character described in my Patents Nos. 714,603 and 714,604, of November 25, 1902.

The leading feature of my present invention consists in providing a cam or equivalent actuating device normally moving through a determined path, but actuated through improved means which permit it to remain stationary when the force opposing its movement exceeds a determined amount, and in actuating the valve through connections the movements of which are determined by the movements of the devices aforesaid.

My invention further consists in various improvements in connection with the mechanism for actuating, connecting, and removing the valves, all of which will be best understood as shown in the drawings in which they are illustrated, and in which—

As shown in the drawings, my pumping-engine embodies two double-acting pumps, the frames for which are indicated at A and A'. The pump-chambers of each of these double-acting pumps are indicated at B and C, said pump-chambers having apertures (indicated at B' b' and C' c') and having also admission and delivery valve ports, (indicated at $B^2$ $B^3$ and $C^2$ $C^3$,) the ports being, as shown, equipped with grid-valve seats.

$B^4$ and $C^4$ indicate stay-bolts extending between the walls of the pump-chambers and extending through cylinders (indicated at $b^4$ and $c^4$) which act to brace the walls of the pump-chambers on the inside.

D indicates the actuating-rod of the plunger, (indicated at D',) said plunger working through the sleeve, (indicated at $B^5$.)

E and E' indicate the admission-valves of the chambers B and C, and F and F' the delivery-valves.

G indicates the supply-chamber by which the water obtains access to the admission-valves, and $g$ indicates the delivery-chamber into which the water passes from the delivery-valves. Both of these chambers G and $g$ have air-chambers (indicated at $G^3$ and $g^3$) at their upper ends, and, as shown, both of the chambers have manhole-apertures (indicated at $G^2$ and $g^2$) in their sides.

Figure 1:
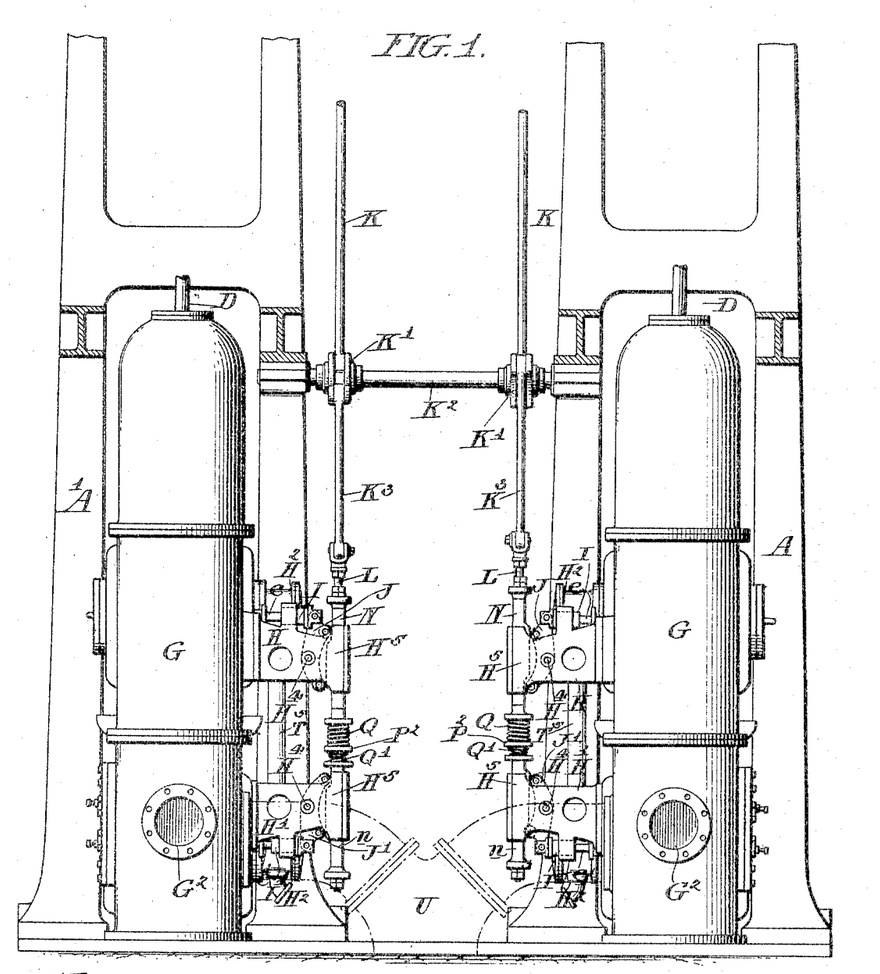
Figure 1 is a side elevation of a double pumping-engine embodying my improvements.

$G'$ indicates the port through which water enters the chamber G, a supply-pipe, such as U, Fig. 1, connecting therewith.

$g'$ indicates an opening in the chamber G, with which the delivery-main is connected.

H and H' indicate brackets extending out from the sides of the pump-chambers and of like construction, except that, as shown, they are secured to the walls of the chamber in reversed positions. These brackets are provided with guide-bearings (indicated at $H^2$) and with parallel outwardly-extending flanges $H^3$ $H^3$, between which extends the bearing-pin $H^4$ and at the ends of which are supported the guideways, (indicated at $H^5$.)

$H^6$ indicates a cover-plate.

Figures 6, 7, 8:
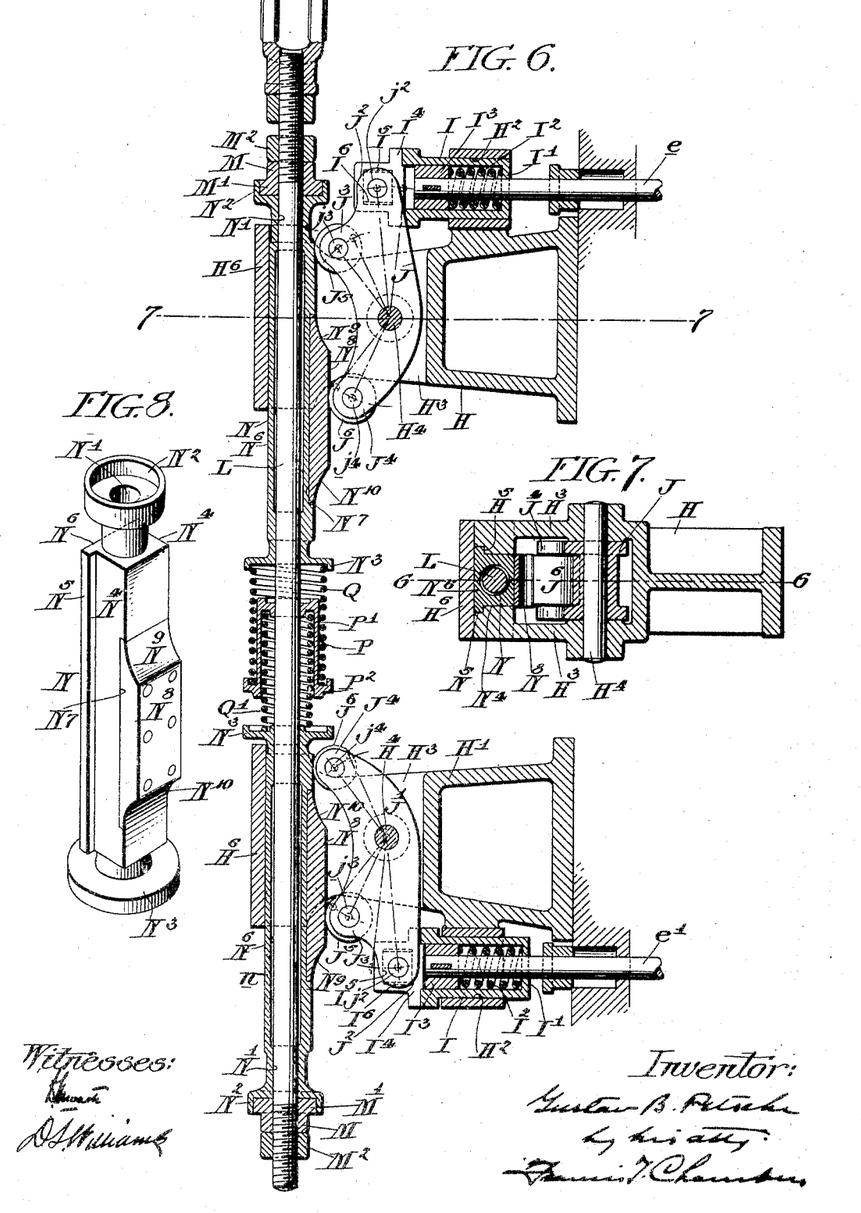
Fig. 6 is an enlarged view of the valve-actuating cams and their immediate connections, taken as on the section-line 6 6 of Fig. 7.
Fig. 7 is a horizontal section taken on the line 7 7 of Fig. 6.
Fig. 8 is a perspective view of one of the sliding blocks.
Figure 10:
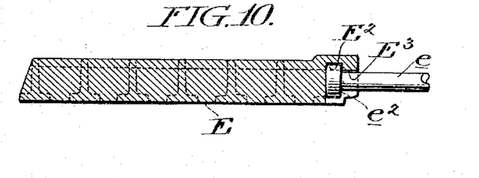
Fig. 10 is a section through the valve, taken on the line 10 10 of Fig. 9.

I is a casing moving in the guideway $H^2$, having one end open for its entire diameter and the other end, I', closed except for a central perforation for the passage of the valve-stem, such valve-stems being indicated in Fig. 6 at $e$, and $e'$ indicating the valve-stems of admission-valves E and E', while the similar valve-stems of the delivery-valves F and F' are correspondingly indicated by the symbols $f$ and $f'$. In each of the casings I is situated, as shown, a spring $I^2$, which abuts against the end I' of the casing at one end and against the head $I^3$, secured to the end of the valve-spindle, at the other end.

$I^4$ indicates a head or cover secured over the open end of the casing I and having projecting from it a lug or flange provided with a slot (indicated at $I^5$) in which is situated a sliding block, (indicated at $I^6$.)

J and J' are cam-levers pivoted on the bearing-pins $H^4$ and having, in effect, three arms, (indicated at $J^2$, $J^3$, and $J^4$,) the arms $J^2$ carrying pins $j^2$, by which they are engaged with sliding blocks $I^6$, and the arms $J^3$ and $J^4$ carrying pins $j^3$ and $j^4$, which serve as the bearings for cam-rollers, (indicated at $J^5$ and $J^6$.)

Figure 2:
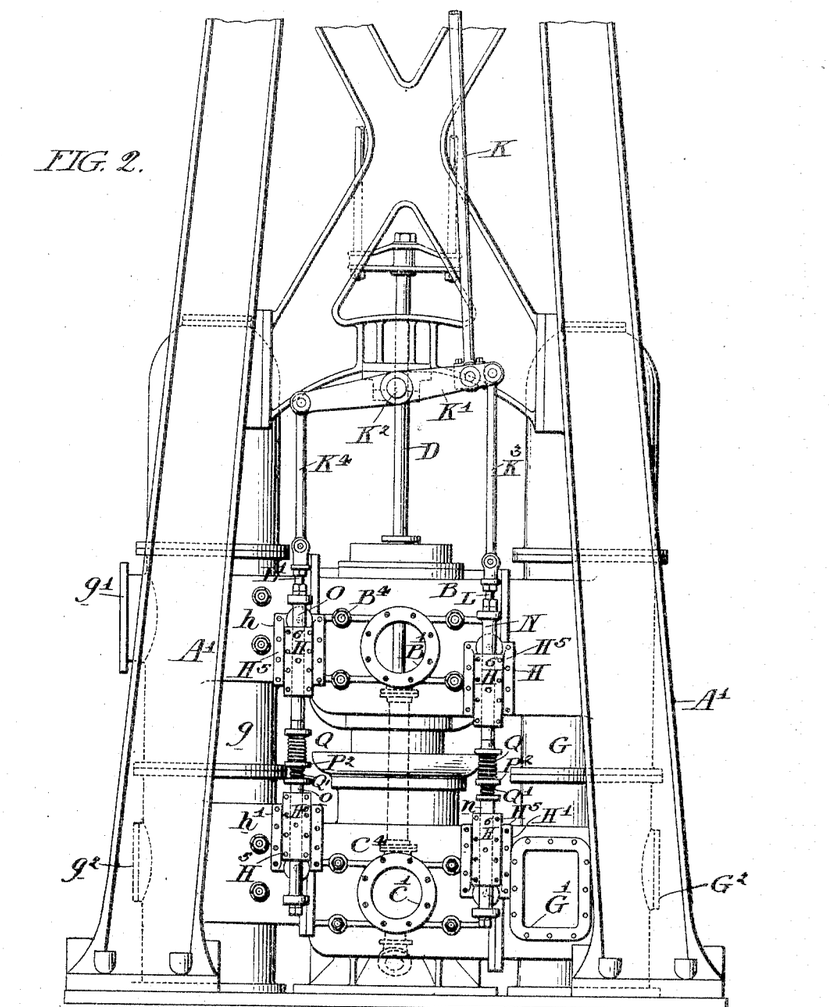
Fig. 2 is a front elevation of the said pumping-engine.
Figure 3:
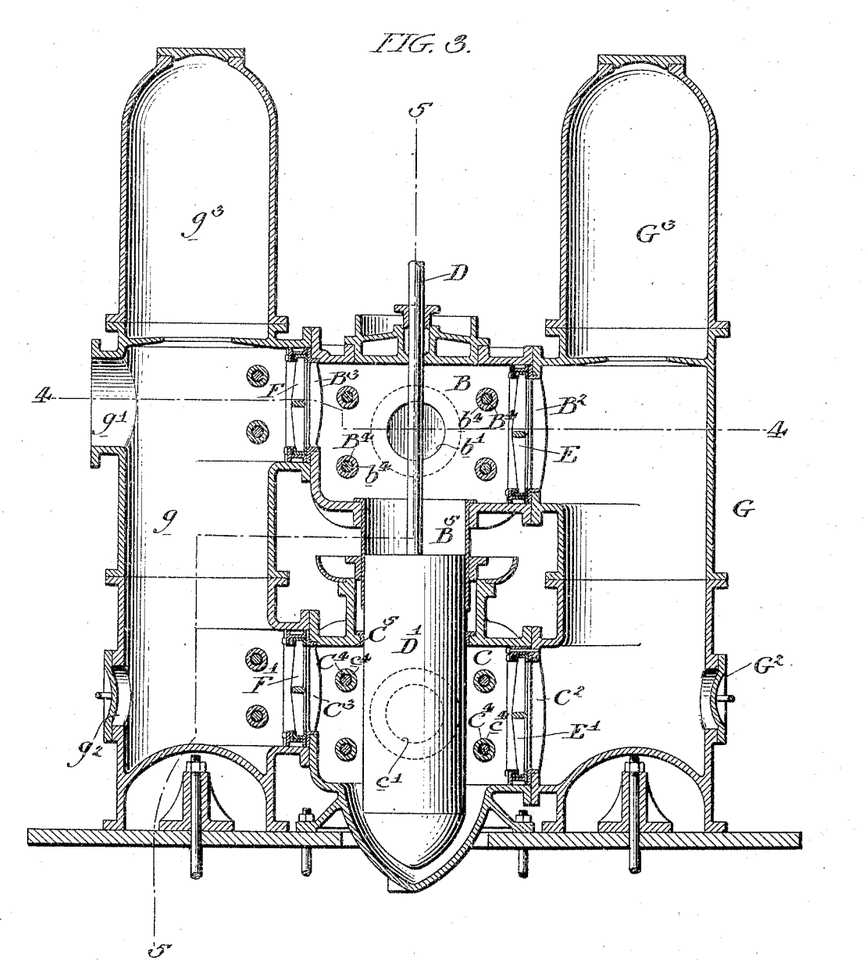
Fig. 3, a vertical section taken as on the line 3 3 of Fig. 4.

K K, Figs. 1 and 2, indicate connecting-rods actuated by a part of the engine (not shown) and coupled to the rock-levers K' K', which are journaled on the bearing-shaft $K^2$ and connected at their ends by connecting-rods $K^3$ and $K^4$ with the reciprocating rods L and L'. These rods (see Fig. 6) are threaded at top and bottom and support what I will call the "blocks" N and $n$, the construction of which is best shown in Fig. 8. These blocks have perforations (indicated at N') through which the rod passes and by preference at one end a cylindrical extension, (indicated at $N^2$,) serving as one member of a dash-pot organization, and at the other end a flanged head (indicated at $N^3$) to serve as a spring-seat. The sides of the blocks are formed, as shown at $N^4$ and $N^5$, to fit in the guideways $H^5$ of the brackets H and H', and the back of the blocks (indicated at $N^6$) are formed to come flush with the outer face of the guideways and so as to rest against the back bearing-plates, (indicated at $H^6$.) As shown, the blocks are chambered on their front faces, as indicated at $N^7$, to receive the hardened-steel cams, which have, as shown, inclined faces $N^9$ and $N^{10}$, connected by a flat elevated face $N^8$. The rods L and L' are provided at each end with adjusting-nuts M M, which have by preference a cylindrical extension M', serving as the other member of the dash-pot buffer in connection with the ends $N^2$ of the sliding blocks. The adjusting-nuts are secured in position by jam-nuts $M^2$. The blocks N and $n$ are placed on the rods, as shown in Fig. 6, with their spring-seats $N^3$ placed opposite to each other, and a spring or springs is provided to act between them, so as to keep the blocks normally pushed apart to the full extent permitted by the adjusting-nuts M M. In order to secure the utmost possible uniformity in spring-pressure, I employ by preference the construction illustrated in Fig. 6, in which a thimble P is placed on the rod L to keep back the sliding blocks, said thimble being provided with an inwardly-extending flange P' at one end and an outwardly-extending flange $P^2$ at the other end, and in connection with this thimble I employ the two springs Q and Q', overlapping each other, as shown, and resting on the flanges of the thimble at one end and against the spring-seats $N^3$ of the blocks at the other end. As shown in the drawings and as I prefer to construct the apparatus, the cams on the sliding blocks are so arranged as to maintain contact at all times with both of the cam-rollers $J^5$ and $J^6$ on the cam-levers J and J'.

Figures 4, 9:
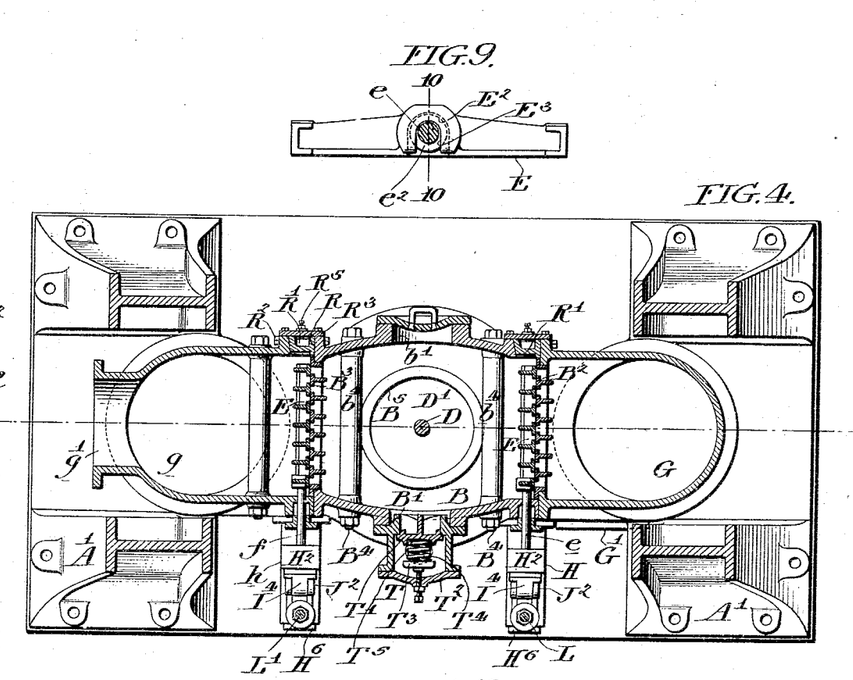
Fig. 4, a plan view taken on the horizontal section 4 4 of Fig. 3.
Fig. 9 is an end view of the valve, showing the mode of securing the valve-stem thereto.
Figures 11, 12:
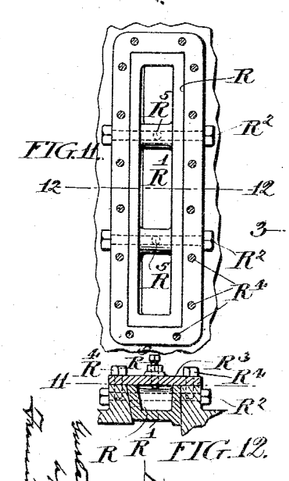
Fig. 11 is an enlarged elevation showing the aperture in the chamber through which the valve is inserted and moved and means for closing said aperture, said view being taken on the line 11 11 of Fig. 12.
Fig. 12 is a cross-sectional view taken on the line 12 12 of Fig. 11.

In order to provide for the insertion and removal of the valves with the utmost convenience and the least possible disorganization of the erected engine, I provide in the casing at the rear end of each valve an aperture R, through which the valve can be readily removed. This aperture can be closed in any convenient way. As illustrated, it is formed with inwardly-converging walls and closed by a taper gate R', fitting against these walls, as shown in Figs. 4, 11, and 12. I have shown transverse bolts $R^2$ $R^2$ extending through this taper gate and through the flanged walls of the aperture, and I have also shown a plate $R^3$ held in place over the aperture by bolts $R^4$ and through which extend binding-screws, (indicated at $R^5$,) which act to press the taper block R' tightly to its tapered seat.

Figure 5:
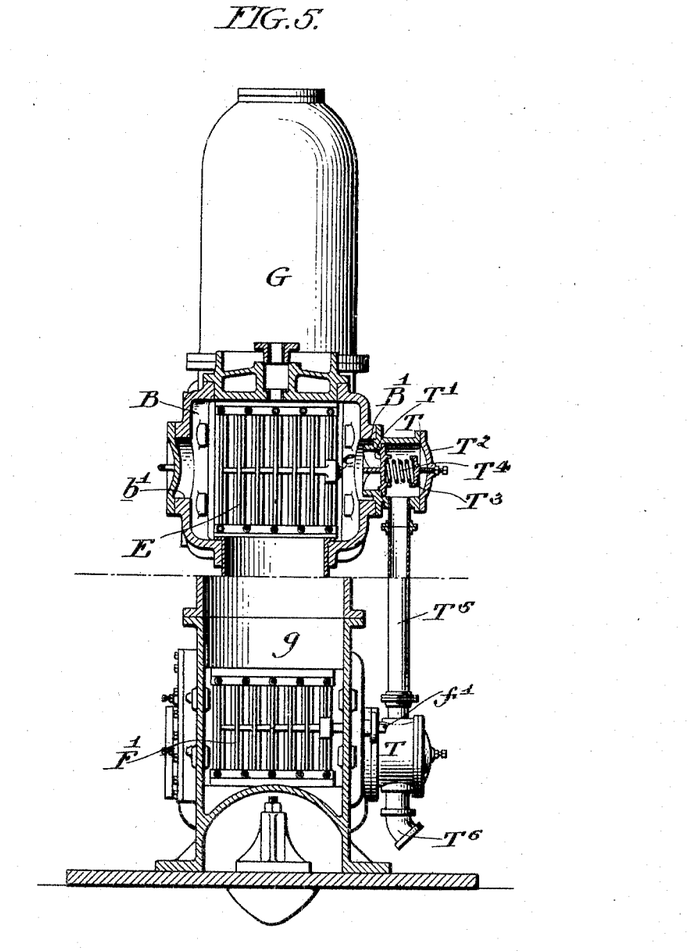
Fig. 5 is a vertical section taken on the line 5 5 of Fig. 3.

In Fig. 5 I have shown as secured on the apertures B' and C' of the pump-chambers valve-chambers T T, having their ports normally closed by valves T', which are held in place by springs $T^4$, abutting against the valves at one end and against an adjustable cap $T^3$ at the other end, said cap $T^3$ being secured to the heads $T^2$ of the valve-chambers. As shown, the valve-chambers T T of the upper and lower pump-chambers are connected by a conduit T⁵, while from the lower valve-chamber leads an outlet-pipe T⁶. These valves T' act simply as snifting-valves, remaining seated under all normal conditions, but yielding to permit the escape of water when by reason of any disarrangement of the valves there is danger of bursting the pump-chamber.

The operation of the described construction is readily followed. Both the plunger and reciprocating rods L and L' are positively actuated by connections with moving parts of the engine and move in a fixed and definite relationship to each other, the motion of the reciprocating rods, and the valve-actuating mechanism connected therewith, while such mechanism preserves its normal connection with the rods, being such as to open the admission and delivery valves at what would theoretically be the proper times, supposing that the operation of the valves bear a fixed relationship to the motion of the plunger. As a matter of fact, however, it has been found that there are not infrequently variations between the actual flow of water and that which would theoretically be due to the motion of the plunger and that therefore and at such times the valves at their theoretical time of movement, especially in opening, are subjected to great pressure which acts in opposition to the valve-actuating mechanism and which if proper provision is not made is exceedingly apt to result in breakages, for which reason, as described in my former applications already referred to, I provide yielding connections in valve-actuating machanism which will permit the valve to remain stationary when the forces opposing their movement exceed predetermined amounts, and my present invention consists, mainly, in the combination, with the positively-reciprocating rods L or L', of the sliding blocks secured upon said rods and held in normal position thereon by resilient means which permit the blocks to remain stationary irrespective of the movement of the reciprocating rods when the forces opposing their movements exceed a determined amount. These blocks are connected to actuate the valves and by preference are coupled therewith through cams, as shown and described, this form of actuating connection having been found to give the best results. Thus it will be seen, for example, that as the rod L, Fig. 6, moves up and down the cam carrying blocks N and $n$, held normally in the positions indicated by the actions of the springs Q Q', will operate through the levers J and J' upon the admission-valves of the upper and lower cylinders, causing said valves to open and close at the theoretically proper points with respect to the motion of the plunger D'. As shown in Fig. 6, the upper admission-valve, controlled by the cam-block N and lever J, is in shut position, and the lower admission-valve, controlled by the cam-block $n$ and lever J', in open position, and it will be seen that as the rod L moves upward the lower valve will be closed and the upper valve opened. If, however, for any of the reasons which might affect the motion of the valve the upper valve offers a resistance to the forces tending to open it in excess of the force exerted, through the cam-block N, by the springs Q Q', the said cam-block will remain stationary, the springs being compressed as the rod L moves upward until the resistance to the motion of the valve diminishes to a point below the force exerted by the springs, whereupon the cam-block N will be rapidly forced upward and will of course act with almost instantaneous rapidity on the lever J and the valve-actuating mechanism connected therewith, and to avoid destructive shocks I provide the dash-pot, consisting of the described members N² and M' or any equivalent construction, for checking the rapid motion of the sliding cam-block to its normal position. As shown in the drawings, the sliding cam-blocks when moved in the direction to close the valves which they actuate are held firmly and positively in position by contact with the adjusting-nuts M M. It is, however, advisable to provide for the occurrence of obstructions or forces which tend to prevent the closing of the valves, as well as their opening, and in the construction illustrated I have done this by the resilient connections provided between the sliding casing I, actuated by the cam-levers and the valve-actuating spindles, (indicated at $e$ or $e'$.) It will be seen that in normal position indicated for the valve-spindle $e'$ (see Fig. 6) the head I³ is held by the spring I² in contact with the head I⁴, secured to the end of the casing. Consequently the motion transmitted by the cam-lever J', for instance, in opening the valve is a positive one; but, on the other hand, the force exerted in closing the valve is transmitted through the spring I², so that in case of any resistance beyond that provided for by the spring is met with in closing the valve the said spring will be compressed, as shown in connection with the upper valve-spindle $e$, as shown in Fig. 6.

It will be understood that the mechanism controlling the movements of the delivery-valves F and F' is in all respects similar to that illustrated in Fig. 6 in connection with the admission-valves.

The other features of the engine illustrated have been either sufficiently described or are of such common and well-understood construction as to need no further explanation.

Having now described my invention, what I claim as new, and desire to secure by Letters Patent, is—

1. In a pump, a cam, in combination with, resilient means for actuating said cam, whereby it is enabled to remain stationary when the resistance to its motion exceeds a determined amount, a valve controlling the flow of fluid to or from the pump-chamber, and means, actuated by the movements of the cam, for opening and closing said valve.

2. In a pump, a cam, in combination with, positively-actuated mechanism for moving said cam through a determined path, means for connecting the cam with its actuating mechanism, including a spring, arranged to permit the cam to stand still when the actuating mechanism tends to move it in one direction and a determined resistance to such movement is encountered, a valve controlling a port of the pump-chamber, and means, actuated by the movements of the cam, for opening and closing said valve.

3. In a pump, the combination of a valve, controlling the flow of fluid to or from the pump-chamber, with a positively-reciprocating rod, a block secured upon but longitudinally movable on said rod, resilient means, holding said block normally in fixed position on said rod, and means whereby the movements of the block transmit movement to the pump-valve.

4. In a pump, the combination of a valve controlling the flow of fluid to or from the pump-chamber, and arranged with its back facing the flow of water through its controlled ports, with a positively-reciprocating rod, a block secured upon but longitudinally movable on said rod, resilient means holding said block normally in fixed position on said rod, and means whereby the movements of the block transmit movement to the pump-valve.

5. In a pump, the combination, of a valve controlling the flow of fluid to or from the pump-chamber, with a reciprocating rod, a block secured upon but longitudinally movable on said rod, resilient means holding said block normally in fixed position on said rod, a dash-pot arranged to check the movement of the block to its normal fixed position on the rod, and means whereby the movements of the block transmit movement to the pump-valve.

6. In a pump, the combination of a valve controlling the flow of fluid to or from the pump-chamber, with a reciprocating rod, a block secured upon but longitudinally movable on said rod, resilient means holding said block normally in fixed position on said rod, a cam secured on said block, a cam-lever maintained in contact with and actuated by said cam, and an actuating connection from said cam-lever to the valve.

7. In a pump, the combination, of a valve controlling the flow of fluid to or from the pump-chamber, with a positively-reciprocating rod, a block secured upon but longitudinally movable on said rod, resilient means holding said block normally in fixed position on said rod, and means embodying a resilient element whereby the movements of the block transmit movement to the valve.

8. In a pump, the combination, of a valve controlling the flow of fluid to or from a pump-chamber, with a block longitudinally movable on said rod and secured in normally fixed position thereon by a stop and resilient means holding it against said stop, and means for transmitting motion from the block to the valve arranged to close the valve when the motion of the reciprocating rod is transmitted to the block through the stop and to open the valve when said rod's motion is transmitted to the block through the resilient means aforesaid.

9. In a pump, the combination of a valve controlling the flow of fluid to or from a pump-chamber, with a block longitudinally movable on said rod and secured in normally fixed position thereon by a stop and resilient means holding it against said stop, means for transmitting motion from the block to the valve arranged to close the valve when the motion of the reciprocating rod is transmitted to the block through the stop and to open the valve when said rod's motion is transmitted to the block through the resilient means aforesaid, and a resilient element provided in the connecting mechanism between the block and valve and arranged to yield when the strains in closing the valve exceed a determined amount.

10. In a double-acting pump having valves which should open and close alternately and normally at the same time, the combination with two of said valves, of a reciprocating rod, blocks longitudinally movable along said rod, stops secured on said rod determining the normal positions of said blocks, a spring or springs acting to hold said blocks against the stops, and means whereby the motion of the blocks is transmitted to the pump-valves as described.

11. In a double-acting pump having valves which should open and close alternately and normally at the same time, the combination with two of said valves, of a reciprocating rod, blocks longitudinally movable along said rod, stops secured on said rod determining the normal positions of said blocks, a spring or springs acting to hold said blocks against the stops, cams secured on the blocks, cam-levers actuated by said cams, and means for transmitting the motion of said cam-levers to the valves.

12. In a double-acting pump having valves which should open and close alternately and normally at the same time, the combination with two of said valves, of a reciprocating rod, blocks longitudinally movable along said rod, stops secured on said rod determining the normal positions of said blocks, a spring or springs acting to hold said blocks against the stops, cams secured on the blocks, cam-levers actuated by said cams, and means for transmitting the motion of said cam-levers to the valves, including a resilient element.

13. In a pump, a reciprocating valve-actuating rod, in combination with sliding blocks supported thereon, stops arranged on the rod to fix the normal positions of said blocks, a thimble P with an inwardly-extending flange at one end and an outwardly-extending flange at the other end, springs abutted against the ends of the blocks and against the flanges of the thimble P said springs overlapping each other, and means whereby the movements of the blocks transmit motion to the valves of the pump.

14. In a pump, a reciprocating valve-actuating rod, in combination with sliding blocks supported thereon, stops arranged on the rod to fix the normal positions of said blocks, a spring or springs acting to hold the blocks against the stops, cams formed or secured on the blocks, cam-levers actuated by the cams, casings I, I, directly moved by the levers, valve-rods $e$ and $e'$ having heads $I^3$ lying in the casings I I and springs $I^2$, $I^2$, lying in the casings and abutting against the heads $I^3$, $I^3$, as described.

15. In a pump, having grid-valve seats, gridiron-valves movable on said seats and formed with the slotted chambers $E^2$, $E^3$, at one end the slot extending toward the face of the valve, in combination with a pump-chamber having apertures R formed in it opposite to the ends of the valves and of such size as to permit the insertion and removal of the valves therethrough, and valve-rods having heads $e^2$ whereby they engage the slotted chambers $E^2$ $E^3$ of the valves and from which the valve is disengaged by moving it back from its seat.

GUSTAV BERNHARD PETSCHE.

Witnesses:
CHAS. F. MYERS,
D. STEWART.